United States Patent
Li

(10) Patent No.: US 7,684,420 B2
(45) Date of Patent: Mar. 23, 2010

(54) METHOD FOR IMPLEMENTING CROSS-DOMAIN CONSTRAINT ROUTING

(75) Inventor: Fenglin Li, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 399 days.

(21) Appl. No.: 11/512,503

(22) Filed: Aug. 30, 2006

(65) Prior Publication Data
US 2008/0198751 A1 Aug. 21, 2008

Related U.S. Application Data

(63) Continuation of application No. PCT/CN2005/000741, filed on May 27, 2005.

(30) Foreign Application Priority Data

May 31, 2004 (CN) .................. 2004 1 0042693

(51) Int. Cl.
*H04L 12/28* (2006.01)
(52) U.S. Cl. .................. 370/401; 370/230; 370/389; 709/238
(58) Field of Classification Search .................. None
See application file for complete search history.

(56) References Cited

U.S. PATENT DOCUMENTS

| | | | | |
|---|---|---|---|---|
| 6,721,269 | B2* | 4/2004 | Cao et al. | 370/227 |
| 6,728,777 | B1* | 4/2004 | Lee et al. | 709/238 |
| 6,956,821 | B2* | 10/2005 | Szviatovszki et al. | 370/237 |
| 6,985,959 | B1* | 1/2006 | Lee | 709/238 |
| 7,190,698 | B2* | 3/2007 | Svanberg et al. | 370/395.2 |
| 7,319,700 | B1* | 1/2008 | Kompella | 370/400 |

(Continued)

FOREIGN PATENT DOCUMENTS

| | | |
|---|---|---|
| EP | 0 859 491 A1 | 8/1998 |
| JP | 2002-152252 A | 5/2005 |

OTHER PUBLICATIONS

C.Y. Lee, et al; "Exclude Routes — Extension to RSVP-TE", IETF Standard-Working-Draft, Internet Engineering Task Force, IETF, CH, vol. Ccamp, No. 1, Dec. 2003, XP015016658 ISSN: 0000-0004, chapters 4-7.

JP Vasseur, Cisco Systems, et al; "Inter-area and Inter-AS MPLS Traffic Engineering", IETF Standard-Working-Draft, Internet Engineering Task Force, IETF, CH, Feb. 2004 (2004-02), XP015036434, ISSN: 0000-0004, chapters 1-9.

D. Awduche, Movaz Networks D et al; "RSVP-TE: Extensions to RSVP for LSP Tunnels", IETF Standard, Internet Engineering Task Force, IETF, CA, Dec. 2001 (Dec. 2001), XP015008988 ISSN: 0000-0003, the whole document.

(Continued)

*Primary Examiner*—Bob A Phunkulh
(74) *Attorney, Agent, or Firm*—Ladas & Parry LLP

(57) ABSTRACT

The present invention discloses a method for implementing cross-domain constraint routing, through setting in addition the border node identifier in the ERO sub-objects saved in ERO corresponding to nodes that a route will pass, this invention realizes the distributed calculation of the route. When calculating the path of cross-domain constraint routing, the original node determines the first border node that the route will pass based on the border node identifiers set in the ERO sub-objects in ERO, calculates the path to the first border node, and then sends a PATH message; the first border node determines, based on the next ERO sub-object with a border node identifier in the ERO of the received PATH message, the next border node that the route will pass, calculates the path to the further next border node, and then sends the PATH message; . . . Repeat such a process until the PATH message reaches the destination node.

10 Claims, 3 Drawing Sheets

U.S. PATENT DOCUMENTS

| | | | |
|---|---|---|---|
| 7,336,648 B1* | 2/2008 | Sasagawa | 370/351 |
| 7,340,169 B2* | 3/2008 | Ovadia et al. | 398/57 |
| 7,436,855 B2* | 10/2008 | Lee et al. | 370/471 |
| 2003/0103510 A1* | 6/2003 | Svanberg et al. | 370/395.2 |
| 2003/0137971 A1* | 7/2003 | Gibson et al. | 370/351 |
| 2003/0142643 A1* | 7/2003 | Yang et al. | 370/328 |
| 2003/0227919 A1* | 12/2003 | Zelig et al. | 370/392 |
| 2004/0165537 A1* | 8/2004 | Lee et al. | 370/252 |
| 2004/0218536 A1* | 11/2004 | Yasukawa et al. | 370/238 |

OTHER PUBLICATIONS

International Search Report: mailed Sep. 1, 2005; PCT/CN2005/000741.

European Search Report: dated May 7, 2007; PCT/CN2005000741;.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|L|   Type      |     Length    |    IPv4 address (4 bytes)     |
+-+-+-+-+-+-+-+-+-+-+-+-+-+-+-+-+-+-+-+-+-+-+-+-+-+-+-+-+-+-+-+-+
| IPv4 address (continued)      | Prefix Length |     Resvd     |
+-+-+-+-+-+-+-+-+-+-+-+-+-+-+-+-+-+-+-+-+-+-+-+-+-+-+-+-+-+-+-+-+
```

Figure 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|L|   Type      |     Length    |    IPv6 address (16 bytes)    |
+-+-+-+-+-+-+-+-+-+-+-+-+-+-+-+-+-+-+-+-+-+-+-+-+-+-+-+-+-+-+-+-+
| IPv6 address (continued)                                      |
+-+-+-+-+-+-+-+-+-+-+-+-+-+-+-+-+-+-+-+-+-+-+-+-+-+-+-+-+-+-+-+-+
| IPv6 address (continued)                                      |
+-+-+-+-+-+-+-+-+-+-+-+-+-+-+-+-+-+-+-+-+-+-+-+-+-+-+-+-+-+-+-+-+
| IPv6 address (continued)                                      |
+-+-+-+-+-+-+-+-+-+-+-+-+-+-+-+-+-+-+-+-+-+-+-+-+-+-+-+-+-+-+-+-+
| IPv6 address (continued)      | Prefix Length |     Resvd     |
+-+-+-+-+-+-+-+-+-+-+-+-+-+-+-+-+-+-+-+-+-+-+-+-+-+-+-+-+-+-+-+-+
```

Figure 3

METHOD FOR IMPLEMENTING CROSS-DOMAIN CONSTRAINT ROUTING

CROSS REFERENCE TO RELATED APPLICATIONS

This application is a continuation application of PCT Application No. PCT/CN2005/000741, filed May 27, 2005, entitled "Method for implementing cross-domain constraint routing", which claims priority to the Chinese Patent Application No. 200410042693.7, filed with the Chinese Patent Office on May 31, 2004 and entitled "Method for implementing cross-domain constraint routing", the entire contents of both of which are incorporated herein by reference in their entireties.

FIELD OF THE INVENTION

The present invention relates to the techniques of constraint routing in Multi-Protocol Label Switching Traffic Engineering (MPLS TE), and particularly to a method of implementing a cross-domain constraint routing in MPLS TE.

BACKGROUND OF THE INVENTION

Along with the explosive growing of the networks, traffic of service data on the networks is increasing in exponential terms, causing frequently network congestions. At present, the nodes in a network always select the shortest path without considering such factors as bandwidth, which results in the problem that the service data will not be switched to other paths even if there is congestion in a certain path. When the traffic of service data in the network is relatively small, there is no severe problem. When networks are no longer only the object of research and more and more applications of network have been implemented, however, the network congestion resulting from the method of selecting the shortest path as the preferred path for routing service data becomes much more severe.

Multi-Protocol Label Switching (MPLS), as an overlaid model, makes it easy to establish a virtual topology on the physical network topology and to map the traffic of service data on this virtual topology. Therefore, there emerges the technique of MPLS TE which is a combination of MPLS and traffic engineering. MPLS TE is able to solve the problem of network congestion caused by the method of routing service data on the shortest path first.

At present, MPLS TE includes four components: a packet forwarding component, an information advertisement component, a signaling component, and a path calculation component. With the coordination of the four components, MPLS TE implements the routing of service data and the transmission of service data on the determined route.

The packet forwarding component of MPLS TE forwards the service data in the format of packet along a pre-established Label Switched Path (LSP) through labels. As LSP is established in advance according to the congestion status of the network, it is possible to avoid the disadvantage caused by selecting the shortest path for routing service data.

The information advertisement component of MPLS TE extends the Interior Gateway Protocol (IGP) of the existing networks to advertise the information of link status. The information of link status includes: maximum bandwidth, maximum bandwidth can be reserved, current reserved bandwidth, and link color, etc. Each node in a network maintains the link attributes and topology attributes of the network by the link status information it received, which will form a Traffic Engineering Data Base (TEBD) of service data. Using TEBD, nodes in the network can calculate the routes for transferring service data with various constraints.

The signaling component of MPLS TE is for reserving resources, and establishing LSP for transferring service data. LSP can be established by means of Constraint Routing-Label Distribution Protocol (CR-LDP) or Resource Reservation Protocol-Traffic Engineering (RSVP-TE) extension, the two protocols both support such functions as LSP establishment, explicit routing, and resource information carrying. Take RSVP-TE as an example, in order to establish LSP, RSVP has been extended, i.e., a Label Request object is introduced into RSVP PATH message to enable the nodes in the network to initiate a label request; and the Label object is introduced into RSVP RESV message to enable the network to assign labels, thereby it is possible to establish LSP. In order to establish constraint LSP, an Explicit Route Object (ERO) is introduced into the RSVP RESV message as well.

The path calculation component of MPLS TE employs a CSPF (Constraint Short Path First) algorithm, calculating the route for transferring service data with designated constraints according to the data saved in TEBD. The constraints for routing may be indicated by the ERO that is set in the original node for identifying the route. An ERO includes multiple ERO sub-objects, and each ERO sub-object corresponds to a node or node interface that the route will pass. When the node attribute set in an ERO sub-object of a route is loose, the route may or may not pass the node or the node interface corresponding to this ERO sub-object; when the node attribute set in an ERO sub-object of a route is strict, this route must pass the node or the node interface corresponding to this ERO sub-object.

So far, the techniques for implementing in-domain constraint routing with MPLS TE is quite mature. However, how to implement cross-domain constraint routing with MPLS TE is still a problem to be solved.

There are two methods at present for implementing cross-domain constraint routing with MPLS TE.

The first method: When implementing cross-domain constraint routing, the ERO sub-objects with loose attribute are set in the ERO of the route and are taken as border nodes to carry out cross-domain constraint routing. The procedure includes: MPLS TE first determines, according to the ERO set by the original node, the first node with loose attribute that the route will pass, calculates the path from the original node to the first node with loose attribute, after successful calculation triggers signals to establish LSP, and sends the PATH message carrying the ERO of the route to the first node with loose attribute; then MPLS TE determines, according to the ERO of the route, the next node with loose attribute that will be passed, calculates the path from the first node with loose attribute to the next node with loose attribute, triggers signals after successful calculation to establish LSP, and sends the PATH message carrying the ERO of the route to the next node with loose attribute until MPLS TE calculates the path to the cross-domain destination node.

The second method: When implementing cross-domain constraint routing, make no difference on whether a node is a border node, MPLS TE calculates all the paths of the cross-domain constraint route using TEDB till determines the constraint route from the original node to the destination node, thereby eventually implementing the cross-domain constraint routing.

FIG. 1 is a schematic illustrating the cross-domain constraint routing in the prior art. As shown in FIG. 1, the network includes two domains, AS1 and AS2, wherein the AS1 domain includes Label Switch Router (LSR) A, LSR B, LSR C, LSR D, and LSR E, and the AS2 domain includes LSR A1, LSR B1, LSR C1, LSR D1, and LSR E1. All LSRs have IP addresses based on IPv4, as well as entry IP addresses and exit IP addresses.

Suppose that a cross-domain constraint route is to be established from LSR A to LSR A1. In accordance with the first method, suppose that the ERO sub-objects in LSR A corresponding to LSR A, LSR C, LSR B, LSR A1, LSR B1, and the interface 10.10.3.2 between LSR B and LSR D as shown in FIG. 1 are all of loose attribute, then LSR A needs to calculate the path from LSR A to LSR B, LSR B needs to calculate the path from LSR B to the interface 10.10.3.2 between LSR B and LSR D, and the path from LSR B to LSR C, LSR C needs to calculate the path from LSR C to LSR B1, and LSR B1 needs to calculate the path from LSR B1 to LSR A1, so as to establish the route from LSR A to LSR A1. In FIG. 1, /24 represents the subnet mask of the network, wherein the figures before /24 combined with 0.1 represent the exit addresses of the nodes in the network and the digits before /24 combined with 0.2 represent the entry addresses of the nodes in the network. Therefore, this method requires calculation of the path of each segment on LSR A, LSR B, LSR C, and LSR B1, respectively, while actually it is only needed to calculate the paths from original node to border node, from border node to border node, and from border node to destination node, i.e., only the paths calculated on LSR A, LSR C, and LSR B1 are necessary.

In accordance with the second method, LSR A calculates every possible segment of a path, i.e., calculates the path from LSR A to LSR D via LSR B, and the path from LSR A to LSR C via LSR B. If LSR A fails to calculate an LSP segment, e.g., LSR A fails to calculate the path from LSR B to LSR D, LSR A will send a PATH message to LSR B, and only after LSR B has made the calculation will it be determined that the path segment from LSR B and LSR D does not exist on the route to be established.

Although cross-domain constraint routing may be implemented using MPLS TE in accordance with the above two methods, there may have some flaws in the methods: in the first method, as each segment of a path between original node and border node as well as between border nodes has to be calculated either by defining the attribute of the nodes that the route will pass as strict or by taking the nodes of loose attribute as border nodes, then in the process of implementing cross-domain constraint routing with MPLS TE, the attribute of the nodes that the route will pass has to be frequently defined or unnecessary calculation of certain segment of a path has to be made; in the second method, as the original node needs to calculate every possible segment of a path, unnecessary calculation and signaling action may be caused in the process of implementing cross-domain constraint routing with MPLS TE.

SUMMARY OF THE INVENTION

The present invention is to provide a method for implementing cross-domain constraint routing such that not only cross-domain routing with constraints could be implemented with MPLS TE, but also no unnecessary path calculation is made on the original node or the nodes that the route will pass.

The specific solution in accordance with this invention is presented as follows:

A method for implementing cross-domain constraint routing, applicable in Multi-Protocol Label Switching Traffic Engineering (MPLS TE), wherein border node identifiers are set for sub-objects of ERO corresponding to border nodes that a cross-domain constraint route passes, and the ERO sub-objects are saved in the ERO of the cross-domain constraint route of an original node, the method further includes:

the original node determining a first border node that the cross-domain constraint route will pass based on the ERO sub-objects in which the border node identifiers have been set, calculating path to the first border node, and sending a PATH message with the ERO including the ERO sub-objects corresponding to the nodes excluding the first border node and the nodes before the first border node;

starting from the first border node that receives the PATH message from the original node, each border node after the first border node receiving the PATH message from its previous border node, determining the next border node that the route will pass based on the ERO sub-objects set with the border node identifiers in the ERO carried by the PATH message, calculating the path from this border node to the next border node before sending the PATH message with the ERO including the ERO sub-objects corresponding to the border nodes excluding the next border node and the nodes before it;

the last border node that receives the PATH message calculating the path to the destination node before completing the routing from the original node to the destination node.

The present invention also provides a method for implementing cross-domain constraint routing such that not only cross-domain routing with constraints could be implemented with MPLS TE, but also no unnecessary path calculation is made on the original node or the nodes that the route will pass.

A method for implementing cross-domain constraint routing, applicable in the MPLS TE, including:

the original node determining a first border node that the cross-domain constraint route passes, calculating path to the first border node, and sending a PATH message with the ERO including the ERO sub-objects corresponding to nodes excluding the first border node and the nodes before it;

starting from the first border node, which receives the PATH message sent from the original node, each border node after the first border node receiving the PATH message from the previous border node, determining the next border node that the route will pass, calculating the path from this border node to the next node before sending the PATH message with the ERO including the ERO sub-objects corresponding to the border nodes excluding the next border node and the nodes before the next border node;

the last border node that receives the PATH message calculating the path to the destination node before completing the routing from the original node to the destination node.

As can be seen from the above solution, in accordance with this invention, through setting border node identifiers in addition to the ERO sub-objects saved in the ERO corresponding to the nodes that the route passes, the distributed calculation of cross-domain constraint routing can be implemented. When calculating the path of cross-domain constraint routing, the original node determines, according to the border node identifiers set in the ERO sub-objects of the ERO, the first border node that the route will pass, calculates the path to the first border node, and then sends a PATH message; the first border node determines, according to the border node identifier in the next ERO sub-object of the ERO in the received PATH message, the next border node that the route will pass, calculates the path to the next border node, and then sends the PATH message; . . . Repeat such a process until the PATH message reaches the destination node. As the nodes with loose attribute are not taken as border nodes in this invention to carry out the calculation of each segment of the path between original node and border node as well as between border nodes, and the original node does not calculate every possible LSP that the route may pass, the method in accordance with this invention not only makes it possible to implement cross-domain constraint routing in MPLS TE, but prevents the original node or the nodes that the route passes from making unnecessary calculation and signaling action.

BRIEF DESCRIPTION OF THE DRAWINGS

FIG. 2 is a schematic illustrating the coding of ERO sub-object based on IPv4 in accordance with an embodiment of the present invention;
FIG. 3 is a schematic illustrating the coding of ERO sub-object based on IPv6 in accordance with an embodiment of the present invention.

DETAILED DESCRIPTION OF THE INVENTION

The present invention is hereinafter described further in detail with reference to the embodiments and accompanying drawings so as to make the technical solution, and merits thereof more apparent.

Although the present MPLS TE protocol provides a solution to in-domain constraint routing by using ERO, it is very difficult to implement cross-domain constraint routing with the present MPLS TE. Therefore, in accordance with this invention, border node identifiers are added to the ERO of the cross-domain constraint route set by the original node, i.e., set border node identifiers for the ERO sub-objects corresponding to the border nodes that the cross-domain constraint route passes so as to indicate that the node corresponding to this ERO sub-object is a Label Switch Border Router (ASBR). When calculating a route by using CSPF (Constraint Shortest Path First), the original node does not finish the calculation either when the path reaches the next node of loose attribute recorded in the ERO or when the routing fails until the path reaches the next ASBR recorded in the ERO of the route, thereby avoiding unnecessary calculation.

Figure 1:
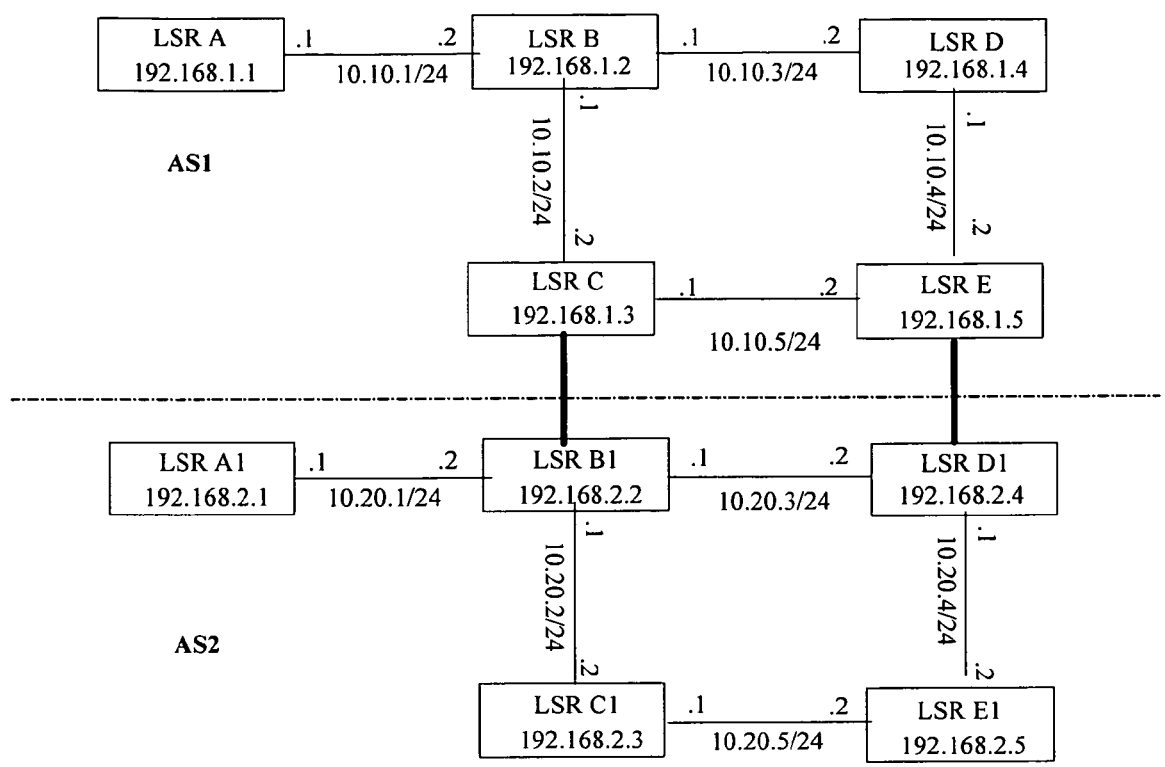
FIG. 1 is a schematic illustrating cross-domain constraint routing in the prior art.

In accordance with an embodiment of the present invention, when the original node is configured with ERO sub-objects corresponding to the nodes that a cross-domain constraint route passes, it is required to indicate definitely whether a node that the route passes is a border node, e.g., as shown in FIG. 1, in accordance with this invention, the nodes that the route passes may be configured at the original node as follows:

Nexthop 192.168.1.2 loose
Nexthop 192.168.1.3 loose border
Nexthop 192.168.2.2 loose border
Nexthop 192.168.2.1 loose Based on the configuration of the embodiment of the present invention, as LSR C and LSR B1 are both identified as border, LSR C and LSR B1 are border nodes. When the original node calculates the route from LSR A to LSR A1, the path from LSR A to LSR C must be calculated first. Then LSR C calculates the path from LSR C to LSR B1. Finally, LSR B1 calculates the path from LSR B1 to LSR A1 so as to complete the calculation of the entire route.

In accordance with the embodiment, the above configuration for each node that the route passes is saved in the original node in the form of ERO sub-object. FIG. 2 is a schematic illustrating the coding of ERO sub-object based on IPv4 in accordance with an embodiment of the present invention. As shown in FIG. 2, L indicates the node corresponding to an ERO sub-object is of loose attribute or of strict attribute, when L is 1, the corresponding node is of loose attribute, and when L is 0, the corresponding node is of strict attribute; Type is a type value, indicating the address of the corresponding node is based on IPv4, IPv6, or a private address; IPv4 address (4 bytes) and IPv4 address (continued) are used for indicating the IP address of the corresponding node, which includes four bytes; Resvd includes one byte, indicating in this embodiment whether the corresponding route is a border node, if yes, the value of the Resvd is 0x01, otherwise, the value of the Resvd is 0x02. L, Type, Length, IPv4 address (4 bytes), IPv4 address (continued), and Prefix Length all have the same coding definitions as the ERO sub-object in the prior art while Resvd, which is not defined in the prior art, is used in this embodiment as the border node identifier of the ERO sub-object so as to indicate whether the corresponding node is a border node.

FIG. 3 is a schematic illustrating the coding of ERO sub-object based on IPv6 in another embodiment of this invention. Likewise, L indicates the node corresponding to an ERO sub-object is of loose attribute or of strict attribute, when L is 1, the corresponding node is of loose attribute, and when L is 0, the corresponding node is of strict attribute; Type is a type value, indicating the address of the corresponding node is based on IPv4, IPv6, or a private address; IPv6 address (16 bytes) and IPv6 address (continued) are used for indicating the IP address of the corresponding node, which includes 16 bytes; Resvd includes one byte, indicating in this embodiment whether the corresponding node is a border node, if yes, the value of the Resvd is 0x01, i.e., the characteristic value indicating the node corresponding to this ERO sub-object is a border node, otherwise, the value of the Resvd is 0x02, i.e., the characteristic value indicating the node corresponding to this ERO sub-object is not a border node. L, Type, Length, IPv6 address (16 bytes), IPv6 address (continued), and Prefix Length all have the same coding definitions as the ERO sub-object in the prior art while Resvd, which is not defined in the prior art, is used in this embodiment as the border node identifier of the ERO sub-object so as to indicate whether the corresponding node is a border node.

In accordance with the embodiment of this invention, the border node identifier also can be set in another field of ERO sub-object, such as an undefined field, and is not limited to the Resvd field.

Figure 4:
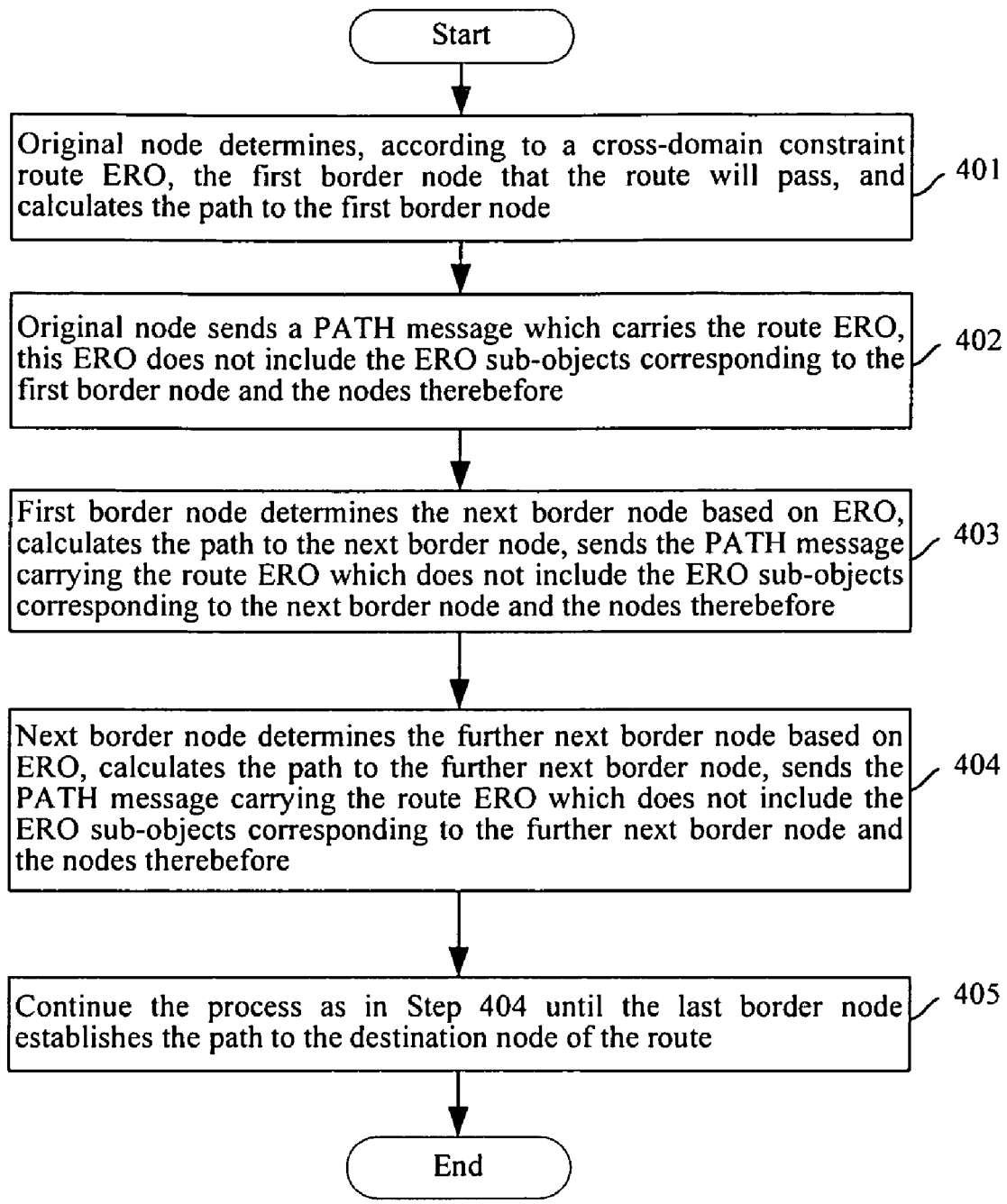
FIG. 4 is the flowchart of cross-domain constraint routing in accordance with an embodiment of the present invention.

As shown in FIG. 4, which is the flowchart of the cross-domain constraint routing in an embodiment of this invention, the steps of the routing includes:

Step 401: The original node determines, according to the ERO of cross-domain constraint route configured in advance at the original node, the first border node that the route will pass, and calculates the path from the original node to the first border node.

Since the ERO of cross-domain constraint route configured in advance, at the original node in accordance with this embodiment includes multiple ERO sub-objects which correspond to each of the nodes that the route will pass, respectively, it is possible to learn, based on the border node identifier of an ERO sub-object, whether the corresponding node is a border node. That is why the original node is able to determine the border nodes that the route will pass based on the ERO sub-objects in the ERO of the route.

The first border node may be determined as in the prior art: Determine, according to the IP addresses of the ERO sub-objects in the ERO, the nodes that the route will successively pass, and thereby determine successively in the order by which the route will pass the nodes whether each of the corresponding ERO sub-objects has a border node identifier, thereby deciding the first border node that the route will pass.

Step 402: The original node triggers RSVP-TE, and sends a PATH message, which carries the ERO of the route. This ERO does not include the ERO sub-objects corresponding to the first border node and the nodes before the first border node.

Since the path has been calculated to the first border node, there is no need to carry the ERO sub-objects corresponding to the first border node and the nodes before it when the PATH message is sent.

When receiving the PATH message, the nodes before the first border node transparently transfer this message as in the prior art without the need of path calculation.

Step 403: The first border node receives the PATH message, determines, according to the border node identifiers of the ERO sub-objects in the ERO, the next border node that the route will pass, calculates the path to the next border node as in the prior art, and sends the PATH message which carries the ERO. This ERO does not include the ERO sub-objects corresponding to the next border node and the nodes before it.

When receiving the PATH message, the nodes between the first border node and the next border node transparently transfer this message as in the prior art without the need of path calculation.

Likewise, the next border node may be determined following the method in the prior art: Determine successively in the order by which the route will pass the nodes whether each of the corresponding ERO sub-objects has a border node identifier, thereby determining the next border node that the route will pass.

Step 404: The next border node receives the PATH message, determines, according to the border node identifiers of the ERO sub-objects in the ERO, the further next border node that the route will pass, calculates the path to the further next border node as in the prior art, and sends the PATH message which carries the ERO. This ERO does not include the ERO sub-objects corresponding to the further next border node and the nodes before it.

When receiving the PATH message, the nodes between the next border node and the further next border node transparently transfer this message as in the prior art without the need of path calculation.

Step 405: Continue the process as in Step 404 until the last border node establishes the path to the destination node of the route, i.e., complete the entire constraint routing from the original node to the destination node after calculating the route from the last border node to the cross-domain destination node, and terminate the procedure.

Suppose that a constraint route is to be established from LSR A to LSR A1 in the schematic shown in FIG. 1, and according to the constraints, this route has to pass LSR B, LSR D, and LSR E. Since the ERO of this route has been saved in advance in LSR A, and the ERO includes ERO sub-objects, to which the border node identifiers have been added for indicating whether the corresponding node is a border node, LSR A determines LSR C as the first border node based on the ERO sub-objects of the route, calculates the path to LSR C, i.e., calculates the path passing LSR B, LSR D, and LSR E successively to LSR C before sending to LSR C the PATH message carrying the ERO of the route. This ERO of the route does not include the ERO sub-objects corresponding to LSR C, LSR B, LSR D, LSR E, and LSR A, respectively; LSR C determines LSR B1 as the next border node based on the ERO sub-objects in the ERO carried by the PATH message, calculates the path to LSR B1 before sending to LSR B1 the PATH message carrying the ERO of the route which does not include the ERO sub-object corresponding to LSR B1; LSR B1 determines the destination node of the route as LSR A1 based on the ERO carried in the PATH message, calculates the path to LSR A1, thereby completes the calculation of the entire cross-domain route from LSR A to LSR A1.

The IP addresses of the entry/exit interfaces that the cross-domain constraint route from LSR A to LSR A1 passes successively are:

10.10.1.2 strict, 10.10.3.2 strict, 10.10.4.2 strict, 10.10.5.1 strict, 192.168.1.3 strict border, 192.168.2.2 loose border, and 192.168.2.1, Wherein 10.10.3.2 strict, 10.10.4.2 strict, and 10.10.5.1 strict transparently transfer the PATH message without calculation of the constraint route.

When the original node does not support the border node identifier of ERO sub-object of this embodiment, i.e., the Resvd fields of all the ERO sub-objects are set as 0, the cross-domain constraint routing will be implemented following Method one and Method two as described in the Background of the invention. If a certain node that the cross-domain constraint route passes does not support the border node identifier of ERO sub-object, it is possible that the information in the Resvd fields of all the ERO sub-objects are lost and set as 0 when this node sends the PATH message to downstream nodes, then it is needed that the downstream nodes supporting the border node identifier of ERO sub-object of the embodiments in this invention are able to properly handle the case with the Resvd fields of ERO sub-objects being 0. As to the destination node, whether supporting the border node identifier of ERO sub-object or not will have no impact on the implementation of this invention.

If other manufacturers have also used the Resvd field of the ERO sub-object and a conflict has been aroused, the worst result may be unnecessary actions of signaling and no worse consequences may be caused.

The foregoing are only the preferred embodiments of this invention and should not be used as limits thereto. Any modification, equivalent substitution and improvement without departing from the spirit and principle of this invention should be covered by the protection scope of the invention.

The invention claimed is:

1. A method for implementing cross-domain constraint routing, applicable in Multi-Protocol Label Switching Traffic Engineering (MPLS TE), comprising:

receiving, by a border node, a PATH message with an Explicit Route Object (ERO) wherein the ERO comprises at least one ERO sub-object, the at least one ERO sub-object respectively corresponds to at least one node that a cross-domain constraint route passes after the border node, and a border node identifier for identifying a border node is set in each ERO sub-object that is corresponding to a subsequent border node that the cross-domain constraint route passes after the border node;

determining, by the border node, a next border node according to the border node identifier in each ERO sub-object, and sending another PATH message to the next border node.

2. The method according to claim 1, wherein the border node identifier is set in an undefined field of the ERO sub-object.

3. The method according to claim 2, further comprising: if the ERO sub-object corresponds to a border node that the cross-domain constraint route passes, setting in the undefined field of the ERO sub-abject a first characteristic value identifying the node corresponding to this ERO sub-object as a border node; if the ERO sub-object corresponds to a non-border node that the cross-domain constraint route passes, selling in the undefined field of the ERO sub-object a second characteristic value identifying the node corresponding to this ERO sub-object as a non-border node.

4. The method according to claim 3, wherein the undefined field is a Resvd field.

5. The method according to claim 2, wherein the undefined field is a Resvd field.

6. The method according to claim 1, wherein the border node is a first border node and the PATH message is received from an original node; the method further comprising:
successively determining, by the original node, in an order that the cross-domain constraint route passes the nodes, whether the saved ERO sub-object in the ERO of each node has a border node identifier, if the ERO sub-object has the border node identifier, determining that the node corresponding to this ERO sub-object is the first border node.

7. The method according to claim 6, further comprising:
when receiving the PATH message, transparently transferring, by nodes between the original node and the first border node, the PATH message successively in order without calculating the path until the PATH message is transferred to the first border node.

8. The method according to claim 7, further comprising:
when receiving the PATH message, transparently transferring, by nodes between the border node and the next border node, the PATH message successively in order without calculating the path until the message is transferred to the last border node.

9. The method according to claim 1, wherein the determining the next border node according to the border node identifier in each ERO sub-object comprises:
successively determining, by the border node, in an order that the cross-domain constraint route passes the nodes, whether the ERO sub-object has a border node identifier, if the ERO sub-object has the border node identifier, the node corresponding to the ERO sub-object is the next border node.

10. An apparatus for implementing a cross-domain constraint routing, comprising:
means for receiving a PATH message with an Explicit Route Object (ERO), wherein the ERO comprises at least one ERO sub-object, the at least one ERO sub-object respectively corresponds to at least one node that a cross-domain constraint route passes after the border node, and a border node identifier is set in each ERO sub-object that is corresponding to a subsequent border node that the cross-domain constraint route passes after the border node;
means for determining a next border node according to the border node identifier in each ERO sub-object, and
means for sending another PATH message to the next border node.

* * * * *